United States Patent
Wang

(10) Patent No.: US 12,003,418 B2
(45) Date of Patent: Jun. 4, 2024

(54) METHOD AND APPARATUS FOR PACKET MATCHING, NETWORK DEVICE, AND MEDIUM

(71) Applicant: New H3C Technologies Co., Ltd., Hangzhou (CN)

(72) Inventor: Yang Wang, Beijing (CN)

(73) Assignee: NEW H3C TECHNOLOGIES CO., LTD., Hangzhou (CN)

( * ) Notice: Subject to any disclaimer, the term of this patent is extended or adjusted under 35 U.S.C. 154(b) by 0 days.

(21) Appl. No.: 18/001,518

(22) PCT Filed: Jun. 25, 2021

(86) PCT No.: PCT/CN2021/102426
§ 371 (c)(1),
(2) Date: Dec. 12, 2022

(87) PCT Pub. No.: WO2022/267018
PCT Pub. Date: Dec. 29, 2022

(65) Prior Publication Data
US 2024/0137317 A1    Apr. 25, 2024

(51) Int. Cl.
*H04L 12/00* (2006.01)
*H04L 45/74* (2022.01)
(Continued)

(52) U.S. Cl.
CPC .......... *H04L 45/748* (2013.01); *H04L 45/742* (2013.01); *H04L 45/7453* (2013.01)

(58) Field of Classification Search
CPC .. H04L 45/748; H04L 45/742; H04L 45/7453
(Continued)

(56) References Cited

U.S. PATENT DOCUMENTS

| | | | | |
|---|---|---|---|---|
| 8,856,203 B1 * | 10/2014 | Schelp | ................ | G11C 15/00 |
| | | | | 709/200 |
| 10,397,115 B1 * | 8/2019 | Hasani | ................ | H04L 45/7453 |

(Continued)

FOREIGN PATENT DOCUMENTS

| | | |
|---|---|---|
| CN | 102281196 A | 12/2011 |
| CN | 102739551 | 10/2012 |

(Continued)

OTHER PUBLICATIONS

Mao, Jian-Biao, et al. (2016). PiBuffer: A Model of OpenFlow Flow Buffer Management in Datacenter Network. *Chinese Journal of Computers*, 39(6), 1093-1104 (English Abstract Provided).
(Continued)

*Primary Examiner* — Frantz Coby
(74) *Attorney, Agent, or Firm* — NORTON ROSE FULBRIGHT US LLP

(57) ABSTRACT

A method and apparatus for packet matching, a network device, and a medium are disclosed, which includes adding N first data packets into N pipelines and configuring a stage for each pipeline as a root node of a decision tree; calculating a first hash value for a first pipeline in the N pipelines, and asynchronously prefetching a first output interface data corresponding to the first hash value from a memory, calculating a second hash value for a second pipeline in the N pipelines while prefetching the first output interface data from the memory, obtaining the first output interface data from the cache when calculation of the hash value for each pipeline is finished, deleting the first data packet when the first output interface data is characterized as being used to forward the first data packet in the first pipeline and adding a second data packet into the first pipeline.

12 Claims, 5 Drawing Sheets

(51) Int. Cl.
   *H04L 45/7453* (2022.01)
   *H04L 45/748* (2022.01)
(58) Field of Classification Search
   USPC ..................................... 709/237, 238, 239
   See application file for complete search history.

(56) References Cited

U.S. PATENT DOCUMENTS

| | | | |
|---|---|---|---|
| 10,397,263 B2* | 8/2019 | Sun | H04L 63/0245 |
| 10,694,006 B1* | 6/2020 | Watson | H04L 69/18 |
| 10,771,387 B1* | 9/2020 | Bosshart | H04L 69/22 |
| 2014/0241361 A1* | 8/2014 | Bosshart | H04L 45/745 370/392 |
| 2015/0222533 A1* | 8/2015 | Birrittella | H04L 5/0055 370/392 |
| 2017/0093715 A1* | 3/2017 | McGhee | H04L 45/745 |
| 2017/0359259 A1* | 12/2017 | Bhaskar | H04L 45/38 |
| 2017/0366459 A1 | 12/2017 | Kfir et al. | |
| 2019/0149472 A1 | 5/2019 | Singh et al. | |
| 2020/0028781 A1 | 1/2020 | Levy et al. | |
| 2021/0263744 A1* | 8/2021 | Crupnicoff | G06F 9/30036 |

FOREIGN PATENT DOCUMENTS

| | | |
|---|---|---|
| CN | 1024739550 | 10/2012 |
| CN | 104579941 A | 4/2015 |
| CN | 112866115 A | 5/2021 |
| EP | 1063827 A2 | 12/2000 |
| EP | 3145134 | 3/2017 |
| JP | 2013515430 | 5/2013 |
| WO | WO 2021114793 | 6/2021 |

OTHER PUBLICATIONS

Extended European Search Report issued in corresponding European Application No. 21943322.4, dated Jul. 27, 2023.
Takemasa et al. "Data prefetch for fast NDN software routers based on hash table-based forwarding tables", *Computer Networks*, 2020.
Notice of Allowance issued in corresponding Japanese Application No. 2022-577333 dated Jan. 30, 2024.

* cited by examiner

METHOD AND APPARATUS FOR PACKET MATCHING, NETWORK DEVICE, AND MEDIUM

CROSS-REFERENCE TO RELATED APPLICATIONS

The present application is a national phase under 35 U.S.C. § 371 of International Application No. PCT/CN2021/102426, filed Jun. 25, 2021, which is incorporated herein by reference in its entirety.

TECHNICAL FIELD

This disclosure relates to communication technology field, especially relates to a method and apparatus for packet matching, network device, and medium.

BACKGROUND

Presently, network devices such as network switches or routers use Forwarding Information Base (FIB) to guide the forwarding of the Internet Protocol (IP) packets or Named Data Networking (NDN) packets. In the process of forwarding packets, a longest match principle is to obtain an output interface from FIB for forwarding the packets. An FIB table entry where the output interface locates is a table entry in the FIB with a longest prefix matching the destination address.

An FIB table entry may be stored in a hash table in the form of key-value, wherein, hash value for a prefix/prefix length is taken as a key, and an output interface corresponding to the prefix/the prefix length is taken as a value. In order to accelerate the packet matching speed, a dynamic decision tree is introduced. Each node in the decision tree represents a possible prefix length, a root node of the decision tree is a prefix length with highest hit rate during the packet matching process, and other possible prefix lengths distribute on child nodes of the decision tree sequentially in a descent order based on the matching hit rates.

Upon a packet to be forwarded is received, an output interface corresponding to the packet to be forwarded is obtained by searching the decision tree to match a destination address for the packet to be forwarded. That is, calculate a hash value of a prefix length corresponding to the destination address and a node of the decision tree, and then find out whether there is an out interface corresponding to the hash value from the hash table in memory. The CPU of the network device needs to access the memory for many times to complete the matching of one packet to be forwarded. When a large number of packets to be forwarded are received, the matching speed of the packets to be forwarded will be slow and the packets to be forwarded cannot be forwarded in time.

SUMMARY

The object of the present disclosure is to provide a method and apparatus for packet matching, a network device, and a medium, to accelerate the packet matching speed and timely forward the packets. The specific technical solution is as follows:

In a first aspect, an example of the present disclosure provides a method for packet matching, which comprises:

adding N first data packets into N pipelines and configuring a stage for each pipeline as a root node of a decision tree, wherein, each of nodes of the decision tree represents a prefix length and prefix lengths for the nodes of the decision tree are different from each other;

adding N first data packets into N pipelines and configuring a stage for each pipeline as a root node of a decision tree, wherein, each of nodes of the decision tree represents a prefix length and prefix lengths for the nodes of the decision tree are different from each other;

calculating a first hash value for a first pipeline in the N pipelines, and asynchronously prefetching a first output interface data corresponding to the first hash value from a memory, storing the first output interface data in a cache, calculating a second hash value for a second pipeline in the N pipelines while prefetching the first output interface data from the memory, and repeatedly performing a process of asynchronously prefetching output interface data corresponding to hash values from the memory, and storing the output interface data in the cache, and calculating hash values of the pipelines while prefetching output interface data from the memory stops until calculation of a hash value for each pipeline in the N pipelines is finished, wherein, the hash value for each pipeline is a hash value of a destination address for a data packet in the pipeline and a prefix length represented by the stage;

obtaining the first output interface data from the cache when calculation of the hash value for each pipeline in the N pipelines is finished; and deleting a first data packet in the first pipeline from the first pipeline when the first output interface data is characterized as being used to forward the first data packet in the first pipeline and adding a second data packet into the first pipeline when receiving the second data packet.

In a possible example, after obtaining the first output interface data from the cache, the method further comprises:

updating the stage for the first pipeline to a right child-node of the root node when the first output interface data is not characterized as being used to forward the first data packet in the first pipeline, and updating output interface information in the first pipeline as the first output interface data.

In a possible example, after obtaining the first output interface data from the cache, the method further comprises:

determining whether the right child-node of the root node in the decision tree is empty;

if the right child-node of the root node is empty, then determining that the first output interface data is characterized as being used to forward the first data packet in the first pipeline; and if the right child-node of the root node is not empty, then determining that the first output data is not characterized as being used to forward the first data packet in the first pipeline.

In a possible example, the method further comprises:

updating the stage for the first pipeline to a left child-node of the root node if the first output interface data corresponding to the first hash value is not obtained from the cache.

In a possible example, the method further comprises:

updating the stage for the first pipeline to be finished matching when the first output interface data is characterized as being used to forward the first data packet in the first pipeline; and deleting a first data packet in the first pipeline comprises:

deleting from the pipelines, a first data packet in a pipeline whose stage is finished matching, after all stages for the N pipelines are updated once.

In a second aspect, an example of the present disclosure provides an apparatus for packet matching, which comprises:

a configuration module to add N first data packets into N pipelines and configure a stage for each pipeline as a root node of a decision tree, wherein, each of nodes of the decision tree represents a prefix length and prefix lengths for the nodes of the decision tree are different from each other;

a prefetch module to calculate a first hash value for a first pipeline in the N pipelines, and asynchronously prefetch a first output interface data corresponding to the first hash value from a memory, store the first output interface data in a cache, calculate a second hash value for a second pipeline in the N pipelines while prefetching the first output interface data from the memory, and repeatedly perform a process of asynchronously prefetching output interface data corresponding to hash values from the memory, and storing the output interface data in the cache, and calculating hash values of the pipelines while prefetching output interface data from the memory stops until calculation of a hash value for each pipeline in the N pipelines is finished, wherein, the hash value for each pipeline is a hash value of a destination address for a data packet in the pipeline and a prefix length represented by the stage;

an obtaining module to obtain the first output interface data from the cache when calculation of the hash value for each pipeline in the N pipelines is finished, and the configuration module is further to delete a first data packet in the first pipeline from the first pipeline when the first output interface data is characterized as being used to forward the first data packet in the first pipeline and add a second data packet into the first pipeline when receiving the second data packet.

In a possible example, the apparatus further comprises:

an updating module to update the stage for the first pipeline to a right child-node of the root node when the first output interface data is not characterized as being used to forward the first data packet in the first pipeline, and update output interface information in the first pipeline as the first output interface data.

In a possible example, the apparatus further comprises:

a determination module to:

determine whether the right child-node of the root node in the decision tree is empty;

if the right child-node of the root node is empty, then determine that the first output interface data is characterized as being used to forward the first data packet in the first pipeline; and if the right child-node of the root node is not empty, then determine that the first output data is not characterized as being used to forward the first data packet in the first pipeline.

In a possible example, the apparatus further comprises:

the updating module to update the stage for the first pipeline to a left child-node of the root node if the first output interface data corresponding to the first hash value is not obtained from the cache.

In a possible example, the apparatus further comprises:

the updating module to update the stage for the first pipeline to be finished matching when the first output interface data is characterized as being used to forward the first data packet in the first pipeline; and the configuration module is specifically used to delete from the pipelines, a first data packet in a pipeline whose stage is finished matching, after all stages for the N pipelines are updated once.

In a third aspect, an example of the present disclosure provides a network device, which comprises:

a processor, a communication interface, a memory and a communication bus, wherein, the processor, the communication interface, the memory complete intercommunication via the communication bus, the memory is used to store a computer program;

the processor is used to implement the blocks in the method in the first aspect upon execution of the program stored on the memory.

In a fourth aspect, an example of the present disclosure provides a computer-readable storage medium, stored therein a computer program that, upon executed by a processor, implements blocks in any one of methods in the first aspect.

In a fifth aspect, an example of the present disclosure provides a computer program product containing instructions that, upon executed on a computer, cause the computer to implement the data processing method in the first aspect.

In the method, apparatus, network device and medium according to the examples of the present disclosure, N first data packets can be matched through N pipelines, after the N first data packets are added into the N pipelines, a first hash value for the first pipeline in the N pipelines may be calculated, a first output interface data corresponding to the first hash value is prefetched asynchronously from a memory and the first output interface data is stored in a cache, a second hash value for a second pipeline in the N pipelines is calculated while the first output interface data is prefetched from the memory. In such a manner, it is equivalent that each time a hash value for one pipeline in the N pipelines is calculated, then the output interface data corresponding to the hash value is prefetched from the memory asynchronously, as such, when the first output interface data corresponding to the first hash value needs to be obtained, the first output interface data can be directly obtained from the cache without accessing memory, which reduces the time required for packet matching. If the first output interface data is characterized as being used to forward the first data packet in the first pipeline, then the first data packet in the first pipeline is deleted from the first pipeline, so as that the second data packet is added into the first pipeline for processing. Compared with the prior art in which the received second data packets can be processed only after all the first data packets in the N pipelines have been forwarded, in the example of the present disclosure, as long as a data packet is deleted from a pipeline, a second data packet can be added into the pipeline and started processing, which can accelerate the matching and forwarding speed for the received data packets.

Of course, implementing any product or method of the present disclosure does not necessarily need to achieve all the advantages described above at the same time.

BRIEF DESCRIPTION OF THE DRAWINGS

In order to more clearly describe the technical solutions of the examples of the present disclosure or of the prior art, drawings that need to be used in examples and the prior art will be briefly described below. Obviously, the drawings provided below are for only some examples of the present disclosure; those skilled in the art can also obtain other drawings based on these drawings without any creative efforts.

DETAILED DESCRIPTION

Figure 1:
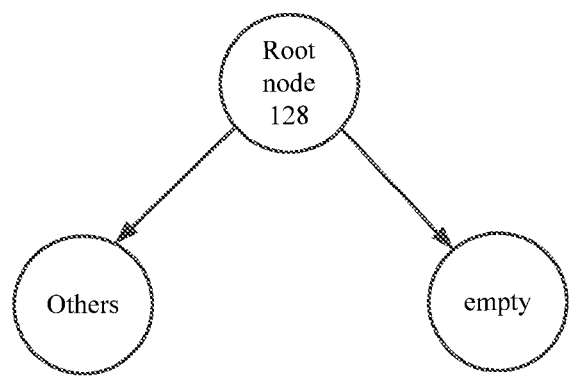
FIG. 1 is an exemplary schematic diagram of a decision tree according to an example of the disclosure.

In order to make the objectives, technical solutions, and advantages of the present disclosure clearer and more understandable, the present disclosure will be described in more detail below with reference to the appended drawings and examples. Obviously, the described examples are only some, and not all, of the examples of the present disclosure. All other examples obtained based on the examples of the present disclosure by those skilled in the art without any creative efforts fall into the scope of protection defined by the present disclosure.

For sake of convenience, relevant concepts involved in the examples of the disclosure are introduced first.

I. FIB Table Entry

A FIB table entry is to guide the forwarding of the IPv4/IPv6/NDN packet. The core structure of a FIB table entry is: prefix/prefix length+output interface, wherein, the prefix length is to indicate which portion of the prefix is a valid matching portion.

1. Taking FIB for IPv4 as an example, the FIB for IPv4 comprises the following two table entries:

Entry1: IP prefix: 10.0.0.0/8 output interface: interface 2;

Entry2: IP prefix: 10.20.0.0/16 output interface: interface 3.

In "10.0.0.0/8", "10.0.0.0" is the prefix, and "8" is the prefix length, which indicates that if the destination address for a received packet matches "10." in the prefix, then the packet will be forwarded through interface 2.

In "10.20.0.0/16", "10.20.0.0" is the prefix, and "16" is the prefix length, which indicates that if the destination address for a received packet matches "10.20." in the prefix, then the packet will be forwarded through interface 3.

In addition, packet matching based on FIB table entry follows the longest matching principle, i.e., in case that the destination address for the packet matches a plurality of table entries, then an output interface in an table entry with a longest prefix among the matched table entries is selected.

For example, it is assumed that a destination IP address for a received packet is 10.0.0.1, then the destination IP address only matches the Entry 1, and thus, a network device selects the output interface 2 in the Entry 1 as the interface for forwarding the packet.

For another example, it is assumed that a destination IP address for a received packet is 10.20.0.1, then the destination IP address matches both the Entry 1 and the Entry 2. However, the prefix length 16 of the Entry 2 is longer than the prefix 8 of the Entry 1, and thus, the network device selects the output interface 3 in the Entry 2 as the interface for forwarding the packet.

2. Taking FIB for NDN network as an example, the NDN network is similar to IP network, for which an IP address is transformed into a directory form to support a directory in terms of text characters.

For example, the FIB comprises the following three table entries:

Entry1: NDN prefix: /Book/Fiction/Science output interface: interface 1

Entry2: NDN prefix: /Book output interface: interface 2

Entry3: NDN prefix: /Shoe output interface: interface 3

"/" is to layer a prefix, the FIB for NDN still follows the longest match principle.

For example, if a destination address for a received packet is: /Book/Fiction/Science/BladeRunner, then the destination address matches both Entry1 and Entry2. However, the prefix length of Entry1 is 3, and the prefix length of Entry2 is 1, and thus, the network device selects output interface 1 in the Entry 1as an interface for forwarding the packet.

For another example, if a destination address for a received packet is: /Book/Fiction/Ancient, the destination address matches the Entry2, and thus, the network device selects the output interface 2 in the Entry2 as an interface for forwarding the packet.

IP network may be considered as a special NDN network: NDN supports prefix segmentation with arbitrary characters and arbitrary lengths; IP network supports segmentation based on two types of Bit, i.e., 0/1, and IP packet has a fixed longest prefix length, wherein, the longest prefix length for IPv6 is 128 bits and the longest prefix length for IPv4 is 32 bits.

II. HASH FIB

The prefix information and the output interface information comprised in the FIB entries are stored in the hash table in the memory in the key-value form. It is assumed that the FIB comprises the following entries:

Entry 1: prefix/a/b/c/d/e output interface 1

Entry2: prefix/a output interface 2

Entry3: prefix/a/b/c/d output interface 3

Entry4: prefix/f/g output interface 4

After a packet received, it is required to match the destination address for the packet with the prefix in each table entry, and an output interface corresponding to the matched longest prefix is taken as the interface for forwarding the packet. However, each time matches a table entry, it is required to access memory once, which will lead to a long time for packet matching.

In order to accelerate the packet matching speed, dichotomy can be used to find the table entry (entries) matching the destination address for the packet. For a packet with the destination address of /a/b/c/d/f, if the dichotomy is employed, then it is tried to match the prefix /a/b/c first. It can be seen that there is no prefix /a/b/c in the FIB table entries. At this time, if the network device mistakenly considers that it cannot match a prefix longer than /a/b/c, then the network device will look for a shorter prefix in the FIB, e.g., a prefix /a, and then the packet is forwarded via the output interface 2 in Entry2, however, the longest prefix matched the destination address should be prefix /a/b/c/d in Entry3, which causes the packet is mistakenly forwarded.

In order to solve the problem that HASH FIB cannot be correctly looked up, virtual entry (entries) may be added into the HASH FIB.

The above HASH FIB is still taken as an example, virtual entries in the path of Entry1 comprise: /a, /a/b, /a/b/c, /a/b/c/d, wherein, /a and /a/b/c/d already exist, there is no need to add them. Two virtual entries with prefixes /a/b and /a/b/c needed to be added for Entry 1.

The prefix length in Entry2 is 1, there is no need to add any virtual entry.

Virtual entries in the path of Entry3 comprise: /a, /a/b, /a/b/c, wherein, /a already exists, virtual entries with prefixes /a/b/c and /a/b may be added.

Virtual entries in the path of Entry4 comprises: /f, a virtual entry with prefix /f may be added.

After the above virtual entries are added, a HASH FIB is obtained, which comprises:

Entry 1: prefix/a/b/c/d/e output interface 1
Entry2: prefix/a output interface 2
Entry3: prefix/a/b/c/d output interface 3
Entry4: prefix/f/g output interface 4
Entry5: prefix/a/b output interface 2
Entry6: prefix/a/b/c output interface 2
Entry7: prefix/f default output interface After the virtual entries are added, dichotomy is employed to look up table entry (entries). For example, if destination address for a received packet is /a/b/w/x/y/z. By searching HASH FIB, it is determined that /a/b/w does not exist, then it can be determined that there must be no better prefix matching for /a/b/w/x/y/z than /a/b/w, therefore, dichotomy may be directly carried out recursively from /a/b/w, which greatly accelerates the searching speed for the HASH FIB. Searching times may be increased from N to Log 2 (N), wherein, N is the largest prefix length, for example for an IPv6 network, the maximum value of N is 128.

III. Optimal Decision Tree

In order to further improve the packet matching speed, in an example of the present disclosure, a decision tree may be generated from all possible prefix lengths, wherein, the principle for generating the decision tree is that a prefix length with higher matching hit rate is closer to the root node of the decision tree, and the left child-node of each node represents a shorter prefix length than that of the right child-node.

For example, if most packets received by the network device hit a prefix with a length of 128 (hereinafter abbreviated as Prefix 128), then the generated decision tree is shown as FIG. 1. The Prefix 128 is the root node; all other prefix lengths are left branches of the root node. As the largest prefix length for IPv6 is 128 bits, there is no prefix longer than 128; right child-node of the root node is empty.

After a packet for the Prefix 128 is received, the output interface can be determined by matching the root node of the decision tree once.

Figure 2:
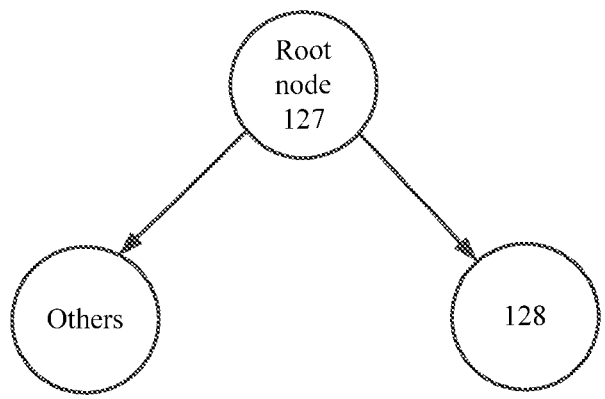
FIG. 2 is an exemplary schematic diagram of another decision tree according to an example of the disclosure.

For another example, if most packets received by the network device hit a prefix with a length of 127 (i.e. Prefix 127), then the generated decision tree is shown as FIG. 2. The Prefix 127 is taken as the root node, the Prefix 128 is taken as the right child-node of the root node, and all other prefix lengths are the left branches for the root node.

After a packet for the Prefix 127 is received, the root node Prefix 127 of the decision tree is matched first, at this time, the match succeeds. Based on the longest match principle, a match for the right child-node Prefix 128 needs to be further performed, at this time, the match fails and the right child-node Prefix 128 has no left and right branches, therefore, the packet for the Prefix 127 matches the root node. The interface can be determined by matching the decision tree twice.

The decision tree may be generated based on all probabilities of hitting prefix lengths by the forwarded packets. For sake of convince, in the example of the present disclosure, the involved symbols have the following meanings:

Px represents the probability of the packet hitting Prefix X; and

Cost(m,n) represents the expectation of blocks need to be consumed by searching an optimal decision tree from prefix m to prefix n.

Taken ipv6 as an example, the object to construct the optimal decision tree is to solve Cost(1,128), i.e., the expectation of blocks need to be consumed by searching an optimal decision tree from prefix 1 to Prefix 128.

For Cost(1,128), it is assumed that 50 is selected as the root node, then there is a probability of $P_1+P_2+\ldots+P_{49}$ that a packet enters the left branches of 50 and there is a probability of $P_{50}+P_{51}+\ldots+P_{128}$ that the packet enters the right branches of 50.

At this time, the expectation of the consumed blocks for selecting 50 as the root node is: $1+(P_1+P_2+\ldots+P_{49})*\text{Cost}(1,49)(P_{50}+P_{51}+\ldots+P_{128})*\text{Cost}(51,128)$.

In the above formula, 1 is the block consumed for matching the root node of the decision tree. Cost(1,49) are the blocks consumed by matching the left branches of the decision tree. Cost(51,128) are the blocks consumed by matching the right branches of the decision tree.

When a root node is selected, the object is to make a minimum Cost(1,128), i.e., the less the blocks consumed by matching the decision tree, the faster the overall packet matching speed.

Therefore, $\text{Cost}(1,128)=\min(1+(P_1+P_2+\ldots+P_{j-1})*\text{Cost}(1,j-1)+(P_j+P_{j+1}+\ldots+P_{128})*\cos((j+1,128))$, wherein, $1<=j<=128$, it is provided that when $j+1>128$, $\text{Cost}(j+1, 128)=0$.

For Cost(1,1),Cost(2,2), . . . , Cost(n,n), a fixed value 1 is obtained.

Then, for Cost(m,n), its formula is:

$$\text{Cost}(m,n)=\min(1+(P_{m-1}+P_m+\ldots P_{j-1})/(P_{m-1}+P_m+\ldots P_n)*\text{Cost}(m,j-1)+(P_j+\ldots P_n)/(P_{m-1}+P_m+\ldots P_n)*\text{Cost}(j+1,n)).$$

$m<=j<=n$, it is provided that when $j+1>n$, $\text{Cost}(j+1, n)=0$. If $m-1$ is 0, then $P_{m-1}$ is calculated as 0.

There are two cases for matching a packet from prefix m to prefix n: in a first case, the longest prefix matching the packet is m−1, Cost (m,n) is entered to determine whether a match better than the prefix m−1 exists; in a second case, the longest prefix matching the packet is longer than m−1, an optimal match needs to be looked up from prefix m to prefix n.

For the first case, if the probability of the packet hitting m−1 is high, but the probability of hitting m is low, it is assumed that when Cost(m,n) is calculated without taking into account the probability of the packet hitting m−1, then the node corresponding to the prefix m in the sub-decision tree Cost (m,n) may be far away from the root node for Cost (m,n), which causes consumption of more blocks for determining the longest match as for m−1. Therefore, in the example of the present disclosure, the probability of hitting m−1 needs to be further taken into account when Cost (m,n) is calculated, so as to accelerate the packet matching speed.

In conjunction with the definition of Cost(m,n), the optimal decision tree may be dynamically generated through a matrix.

For an IPv6 network, the longest length of the prefix is 128 bits, therefore, a 128×128 matrix may be defined, each point in the matrix contains two pieces of information: Cost representing the node and Split selected to calculate the Cost.

For example, the point (2,5) records Cost (2,5) and the Split selected when calculating Cost (2,5).

When the optimal decision tree is calculated by means of matrix, a matrix may be generated. First, Cost(m,n) and Split are calculated for points in the diagonal lines of the matrix, and the diagonal lines as whole are right shifted by a square, Cost(m,n) and Split are calculated for points in the diagonal lines obtained after the right shift, and then continue to right shift until all the points on the right side of the diagonal lines of the matrix have been calculated.

Figure 3:
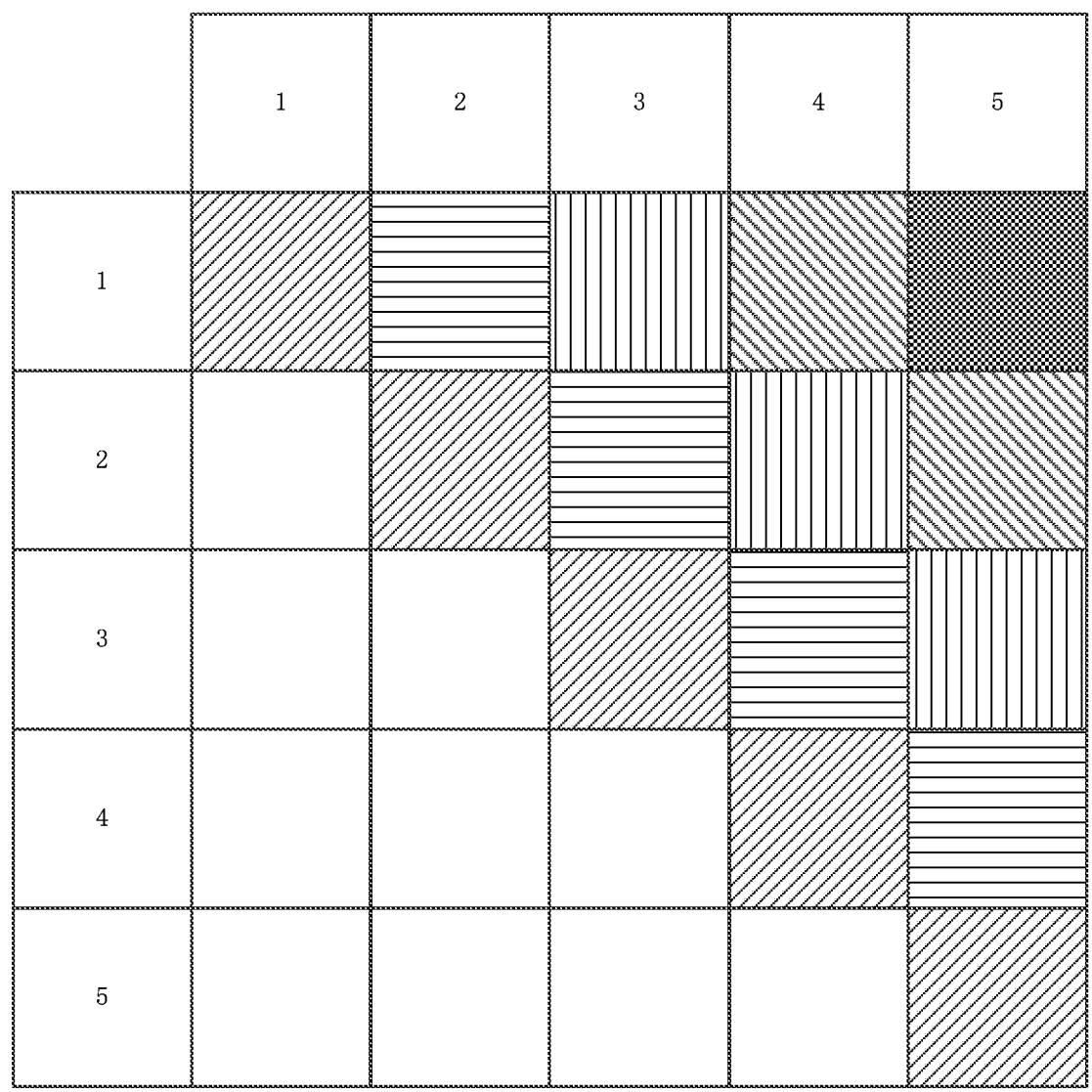
FIG. 3 is an exemplary schematic diagram of a matrix generating a decision tree according to an example of the disclosure.

Taking 5×5 matrix as an example, the calculation sequence is shown as FIG. 3.

In the first round, the Cost and Split corresponding to points at shadow of the left slash lines begin to be calculated from the upper left to the lower right.

In the second round, the Cost and Split corresponding to points at shadow of the horizontal lines begin to be calculated from the upper left to the lower right.

In the third round, the Cost and Split corresponding to points at shadow of the vertical lines begin to be calculated from the upper left to the lower right.

In the fourth round, the Cost and Split corresponding to points at shadow of the right slash lines begin to be calculated from the upper left to the lower right.

In the fifth round, the Cost and Split corresponding to the point at shadow of the grids is calculated.

Then, a final decision tree may be obtained by traversing from the matrix (1, 5).

Figure 4A:
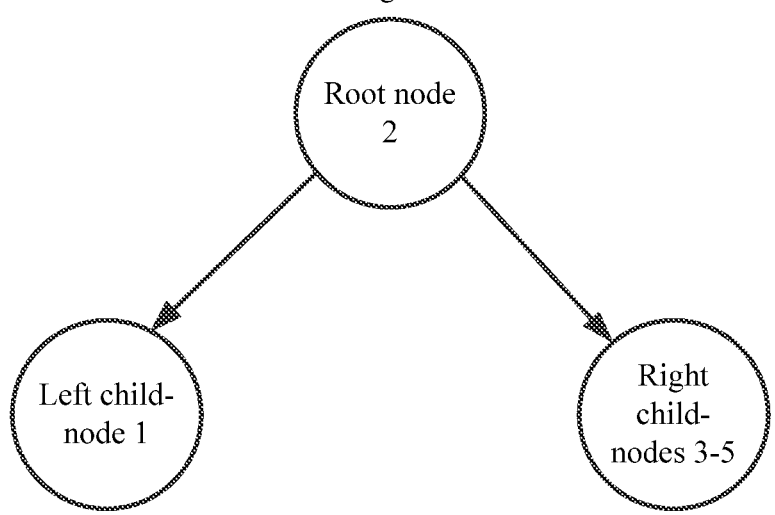
FIG. 4*a* and FIG. 4*b* are exemplary schematic diagrams of a process of generating a decision tree according to an example of the disclosure.
Figure 4B:
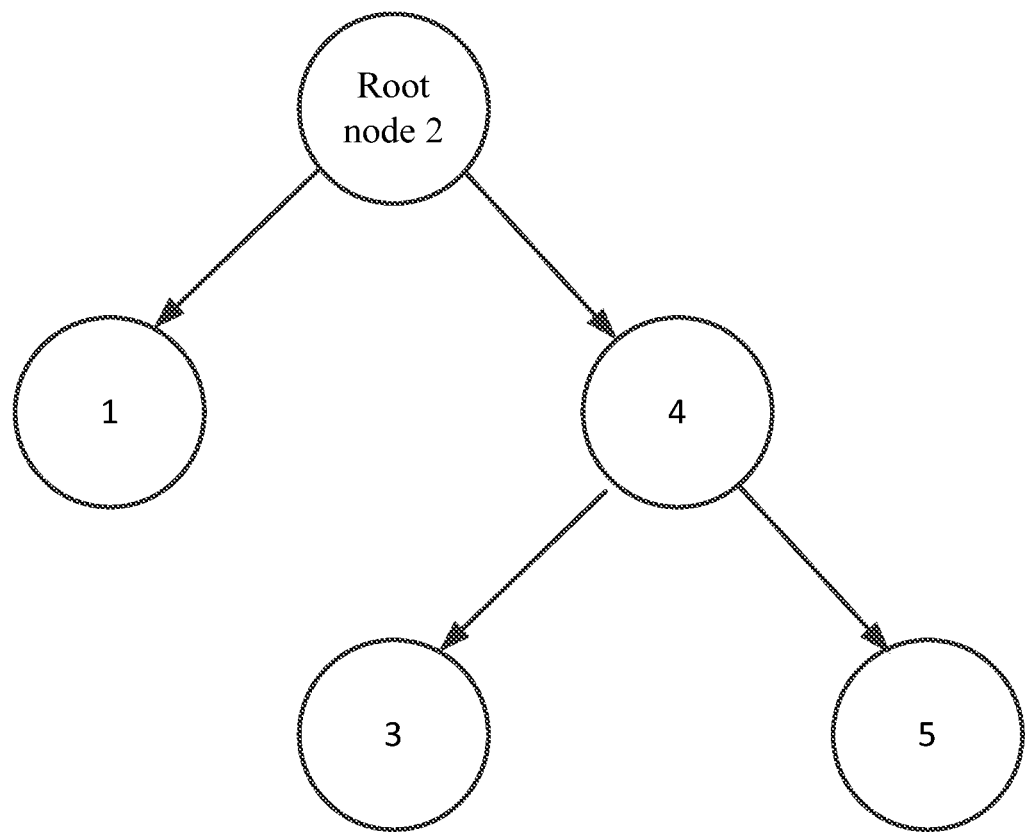

It is assumed that the Split of the node (1,5) is 2, then the obtained decision tree has shape shown as FIG. 4a. The root node is prefix 2, the left child-node corresponds to (1,1) in the matrix, the right child-node corresponds to (3,5) in the matrix. It is assumed that Split corresponding to (3,5) is 4, then the optimal decision tree constructed has shape shown as FIG. 4b.

In conjunction with a specific example, the method for constructing the optimal decision tree is illustrated, taking the longest prefix of 5 as an example, then a 5×5 matrix is constructed.

The network equipment can periodically calculate the probability that the received packet hits each prefix length, and generate the optimal decision tree based on this probability, so that the prefix length with higher hit rate is closer to the root node.

It is assumed, the probability of hitting prefix 1 is 20%; the probability of hitting prefix 2 is 5%; the probability of hitting prefix 3 is 10%; the probability of hitting prefix 4 is 10%; and the probability of hitting prefix 5 is 55%.

First, Cost and Split for each point on the diagonal lines in the matrix are calculated. Cost(1,1),Cost(2,2), . . . ,Cost (5,5) each has a fixed value 1 and for which no Split exists, therefore, the calculated results are as shown in Table 1.

TABLE 1

|  | Prefix 1 | Prefix 2 | Prefix 3 | Prefix 4 | Prefix 5 |
|---|---|---|---|---|---|
| Prefix 1 | Cost = 1<br>Split = Invalid | | | | |
| Prefix 2 | | Cost = 1<br>Split = Invalid | | | |
| Prefix 3 | | | Cost = 1<br>Split = Invalid | | |
| Prefix 4 | | | | Cost = 1<br>Split = Invalid | |
| Prefix 5 | | | | | Cost = 1<br>Split = Invalid |

Then, Cost(1,2), Cost(2,3), Cost(3,4), Cost(4,5) are calculated.

1 or 2 may be selected as the Split when Cost (1,2) is calculated:
- if 1 is selected as the Split, then Cost (1,2) is: 1+(20%+5%)/(20%+5%)*Cost(2,2)=2;
- if 2 is selected as the Split, then Cost (1,2) is: 1+20%/(20%+5%)*Cost(1,1)=1.8; and
- thus, the Split for Cost(1,2) should be 2, and Cost(1,2)=1.8.

2 or 3 may be selected as the Split when Cost(2,3) is calculated:
- if 2 is selected as the Split, then Cost(2,3)=1+(5%+10%)/(20%+5%+10%)*Cost(3,3)=
- if 3 is selected as the Split, then Cost(2,3)=1+(20%+5%)/(20%+5%+10%)*Cost(2,2)=1.71; and
- thus, the Split for Cost(2,3) should be 2, and Cost(2,3)=1.42.

3 or 4 may be selected as the Split when Cost(3,4) is calculated:
- if 3 is selected as the Split, then Cost(3,4)=1+(10%+10%)/(5%+10%+10%)*Cost(4,4)=1.8;
- if 4 is selected as the Split, then Cost(3,4)=1+(5%+10%)/(5%+10%+10%)*Cost(3,3)=1.6; and
- thus, the Split for Cost(3,4) should be 4, and Cost(3,4)=1.6.

4 or 5 may be selected as the Split when Cost(4,5) is calculated:
- if 4 is selected as the Split, then Cost(4,5)=1±(10%+55%)/(10%+10%+55%)*Cost(4,4)=1.86;
- if 5 is selected as the Split, then Cost(4,5)=1±(10%+10%)/(10%+10%+55%)*Cost(5,5)=1.26; and
- thus, the Split for Cost(4,5) should be 5, and Cost(4,5)=1.26.

At this time, the matrix in table 1 is updated as the following Table 2.

TABLE 2

|  | Prefix 1 | Prefix 2 | Prefix 3 | Prefix 4 | Prefix 5 |
| --- | --- | --- | --- | --- | --- |
| Prefix 1 | Cost = 1<br>Split = Invalid | Cost = 1.8<br>Split = 2 | | | |
| Prefix 2 | | Cost = 1<br>Split = Invalid | Cost = 1.42<br>Split = 2 | | |
| Prefix 3 | | | Cost = 1<br>Split = Invalid | Cost = 1.6<br>Split = 4 | |
| Prefix 4 | | | | Cost = 1<br>Split = Invalid | Cost = 1.26<br>Split = 5 |
| Prefix 5 | | | | | Cost = 1<br>Split = Invalid |

Next, calculate Cost(1,3), Cost(2,4), Cost(3,5).

1, 2 or 3 may be selected as Split for Cost(1,3):
- if 1 is selected as the Split, then Cost(1,3)=1±(20%+5%+10%)/(20%+5%+10%)*Cost(2,3)=2.42;
- if 2 is selected as the Split, then Cost(1,3)=1+20%/(20%+5%+10%)*Cost(1,1)+(5%+10%)/(20%+5%+10%)*Cost(3,3)=2;
- if 3 is selected as the Split, then Cost(1,3)=1+(20%+5%)/(20%+5%+10%)*Cost(1,2)=2.28; and
- thus Split for Cost(1,3) should be 2, and Cost(1,3)=2.

2, 3 or 4 may be selected as the Split for Cost(2,4):
- if 2 is selected as the Split, then Cost(2,4)=1+(5%+10%+10%)/(20%+5%+10%+10%)*Cost(3,4)=2.15;
- if 3 is selected as the Split, then Cost(2,4)=1+(20%+5%)/(20%+5%+10%+10%)*Cost(2,2)±(10%+10%)/(20%+5%+10%+10%)*Cost4,4)=2;
- if 4 is selected as the Split, then Cost(2,4)=1+(20%+5%+10%)/(20%+5%+10%+10%)*Cost(2,3)=2.10; and
- thus, the Split for Cost(2,4) is 3, and Cost(2,4)=2.

3, 4 or 5 may be selected as the Split for Cost(3,5):
- if 3 is selected as the Split, then Cost(3,5)=1+(10%+10%+55%)/(5%+10%+10%+55%)*Cost(4,5)=2.18;
- if 4 is selected as the Split, then Cost(3,5)=1+(5%+10%)/(5%+10%+10%+55%)*Cost(3,3)+(10%+55%)/(5%+10%+10%+55%)*Cost(5,5)=2;
- if 5 is selected as the Split, then Cost(3,5)=1+(5%+10%+10%)/(5%+10%+10%+55%)*Cost(3,4)=1.5; and
- thus the Split for Cost(3,5) should be 5, and Cost(3,5)=1.5.

At this time, the matrix shown in table 2 is updated to the following Table 3.

TABLE 3

|  | Prefix 1 | Prefix 2 | Prefix 3 | Prefix 4 | Prefix 5 |
|---|---|---|---|---|---|
| Prefix 1 | Cost = 1<br>Split = Invalid | Cost = 1.8<br>Split = 2 | Cost = 2<br>Split = 2 |  |  |
| Prefix 2 |  | Cost = 1<br>Split = Invalid | Cost = 1.42<br>Split = 2 | Cost = 2<br>Split = 3 |  |
| Prefix 3 |  |  | Cost = 1<br>Split = Invalid | Cost = 1.6<br>Split = 4 | Cost = 1.5<br>Split = 5 |
| Prefix 4 |  |  |  | Cost = 1<br>Split = Invalid | Cost = 1.26<br>Split = 5 |
| Prefix 5 |  |  |  |  | Cost = 1<br>Split = Invalid |

Then, calculate Cost (1,4) and Cost (2,5).

1, 2, 3 or 4 may be selected as the Split for Cost(1,4):

if 1 is selected as the Split, then Cost(1,4)=1±(20%+5%+10%+10%)/(20%+5%+10%+10%)*Cost(2,4)=3;

if 2 is selected as the Split, then Cost(1,4)=1±(20%)/(20%+5%+10%+10%)*Cost(1,1)+(5%+10%+10%)/(20%+5%+10%+10%)*Cost(3,4)=2.33;

if 3 is selected as the Split, then Cost(1,4)=1+(20%+5%)/(20%+5%+10%+10%)*Cost(1,2)±(10%+10%)/(20%+5%+10%+10%)*Cost(4,4)=2.44;

if 4 is selected as the Split, then Cost(1,4)=1+(20%+5%+10%)/(20%+5%+10%+10%)*Cost(1,3)=2.55; and thus the Split for Cost(1,4) should be 2 and Cost(1,4)= 2.33.

2, 3, 4 or 5 may be selected as the Split for Cost(2,5):

if 2 is selected as the Split, then Cost(2,5)=1+(5%+10%+10%+55%)/100% *Cost(3,5)=2.20:

if 3 is selected as the Split, then Cost(2,5)=1+(20%+5%)/100%*Cost(2,2)+(10%+10%+55%)/100%*Cost(4,5)= 2.195;

if 4 is selected as the Split, then Cost(2,5)=1+(20%+5%+10%)/100% *Cost(2,3)+(10%+55%)/100%*Cost(5,5)= 2.147;

if 5 is selected as the Split, then Cost(2,5)=1+(20%+5%+10%+10%)/100%*Cost(2,4)=1.9; and thus the Split for Cost(2,5) should be 5, and Cost(2,5)= 1.9.

At this time, the matrix shown in table 3 is updated to the following Table 4:

TABLE 4

|  | Prefix 1 | Prefix 2 | Prefix 3 | Prefix 4 | Prefix 5 |
|---|---|---|---|---|---|
| Prefix 1 | Cost = 1<br>Split = Invalid | Cost = 1.8<br>Split = 2 | Cost = 2<br>Split = 2 | Cost = 2.33<br>Split = 2 |  |
| Prefix 2 |  | Cost = 1<br>Split = Invalid | Cost = 1.42<br>Split = 2 | Cost = 2<br>Split = 3 | Cost = 1.9<br>Split = 5 |
| Prefix 3 |  |  | Cost = 1<br>Split = Invalid | Cost = 1.6<br>Split = 4 | Cost = 1.5<br>Split = 5 |
| Prefix 4 |  |  |  | Cost = 1<br>Split = Invalid | Cost = 1.26<br>Split = 5 |
| Prefix 5 |  |  |  |  | Cost = 1<br>Split = Invalid |

At last, Cost (1,5) is calculated, the optional Split for it is 1, 2, 3, 4, or 5:
- if 1 is selected as the Split, then Cost (1,5)=1+(20%+5%+10%+10%+55%)/100%*Cost(2,4)=3;
- if 2 is selected as the Split, then Cost(1,5)=1+20%/100%*Cost(1,1)+80%/100%*Cost(3,5)=2.4;
- if 3 is selected as the Split, then Cost(1,5)=1+25%/100%*Cost(1,2)+75%/100%*Cost(4,5)=2.395;
- if 4 is selected as the Split, then Cost(1,5)=1+35%/100%*Cost(1,3)+65%/100%*Cost(5,5)=2.35;
- if 5 is selected as the Split, then Cost (1,5)=1+45%/100%*Cost(1,4)=2.04; and thus the Split for Cost (1,5) is 5, and Cost (1,5)=2.04.

At this time, the matrix shown in table 4 is updated to the following Table 5:

TABLE 5

|  | Prefix 1 | Prefix 2 | Prefix 3 | Prefix 4 | Prefix 5 |
|---|---|---|---|---|---|
| Prefix 1 | Cost = 1<br>Split = Invalid | Cost = 1.8<br>Split = 2 | Cost = 2<br>Split = 2 | Cost = 2.33<br>Split = 2 | Cost = 2.04<br>Split = 5 |
| Prefix 2 |  | Cost = 1<br>Split = Invalid | Cost = 1.42<br>Split = 2 | Cost = 2<br>Split = 3 | Cost = 1.9<br>Split = 5 |
| Prefix 3 |  |  | Cost = 1<br>Split = Invalid | Cost = 1.6<br>Split = 4 | Cost = 1.5<br>Split = 5 |
| Prefix 4 |  |  |  | Cost = 1<br>Split = Invalid | Cost = 1.26<br>Split = 5 |
| Prefix 5 |  |  |  |  | Cost = 1<br>Split = Invalid |

Then, starting from (1,5) of the matrix, a decision tree is generated by traversing Splits layer by layer.

Figure 5A:
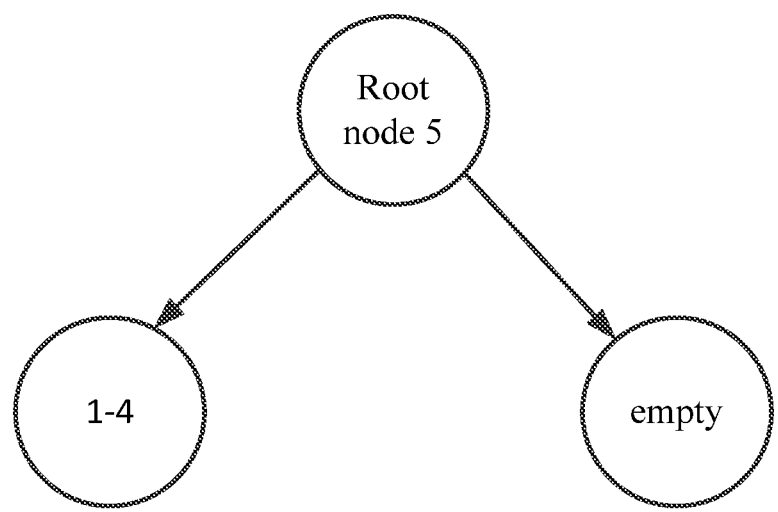
FIG. 5*a*, FIG. 5*b*, and FIG. 5*c* are exemplary schematic diagrams of another process of generating a decision tree according to an example of the disclosure.

First, the Split for (1,5) is 5, at this time the tree has a shape shown as FIG. 5a, prefix 5 is taken as the root node, the left branch of the root node is prefixes 1-4, and the right branch is empty.

Figure 5B:
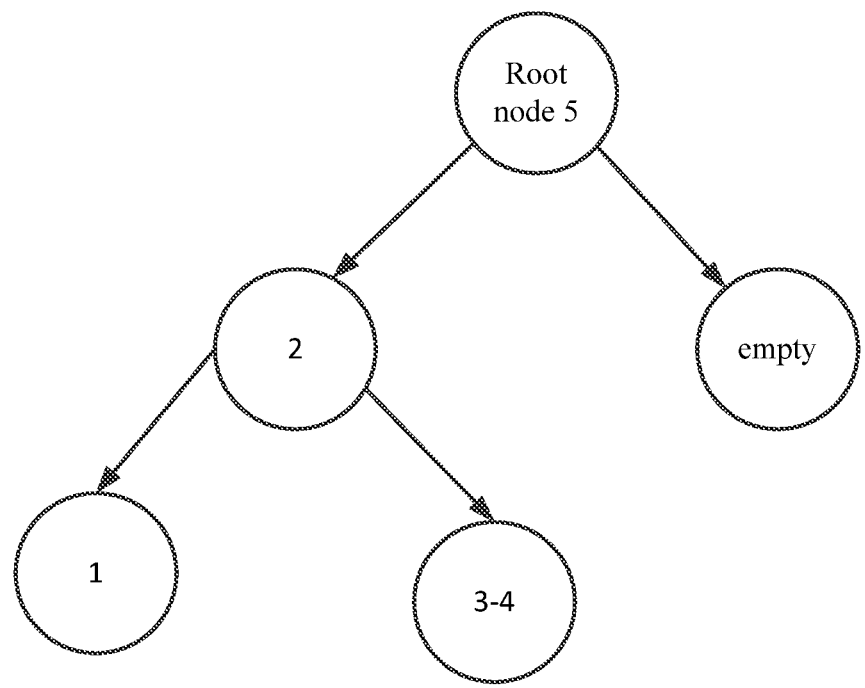

It can be known from the matrix, the Split for (1,4) is 2, then the decision tree has a shape shown as FIG. 5b, the left branch for the Split 2 is 1, and the right branch is prefixes 3-4.

Figure 5C:
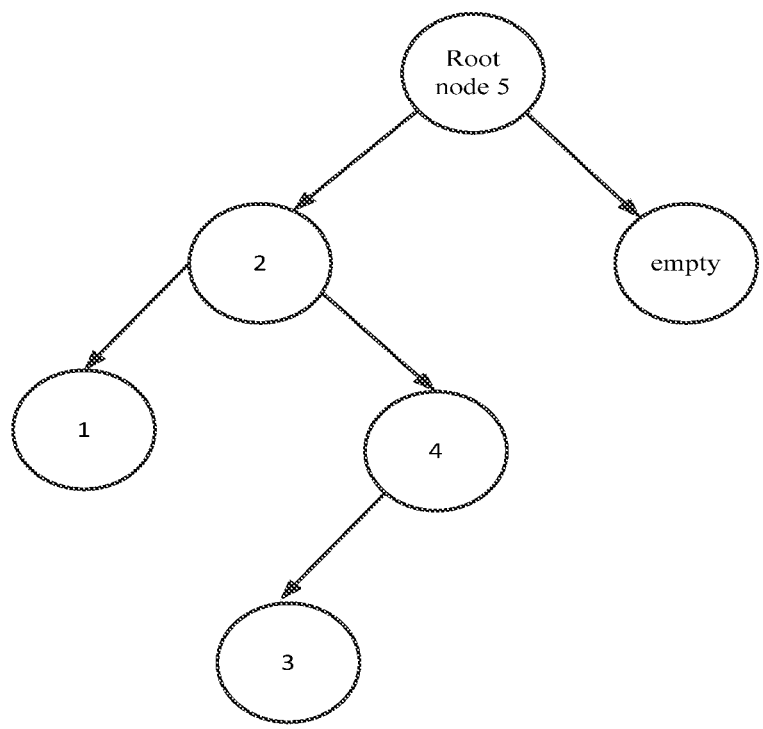

The Split for (3,4) is 4, therefore, the decision tree has shape shown in FIG. 5c, the left branch for the Split 4 is 3, and there is no right branch, and FIG. 5c is the optimal decision tree.

In the present disclosure, the optimal decision tree is stored in the cache of the CPU in the form of array structure, and corresponding FIB is stored in the memory in the form of key-value. In the process of packet matching, the memory needs to be frequently accessed to obtain the output interface corresponding to the prefix matched the packet, which causes a slow packet matching speed.

In order to accelerate the packet matching speed, the CPU may be prompted via a data prefetch instruction that data in the memory is going to be accessed, which makes a memory management module in the CPU asynchronously obtain data to be accessed from the memory.

However, due to the imbalance between the left and right branches of the optimal decision tree, the search path length of each packet to be forwarded is also inconsistent.

For example, if packet 1 and packet 2 are matched at the same time, an interface can be determined after one decision tree matching for packet 1, while the interface can be determined after five decision tree matching for packet 2. Then, after packet 1 is matched once, the forwarding of packet 1 is finished. In fact, the subsequent process is to match the packet 2, so the prefetching operation is meaningless, and the packet matching speed is still slow.

Figure 6:
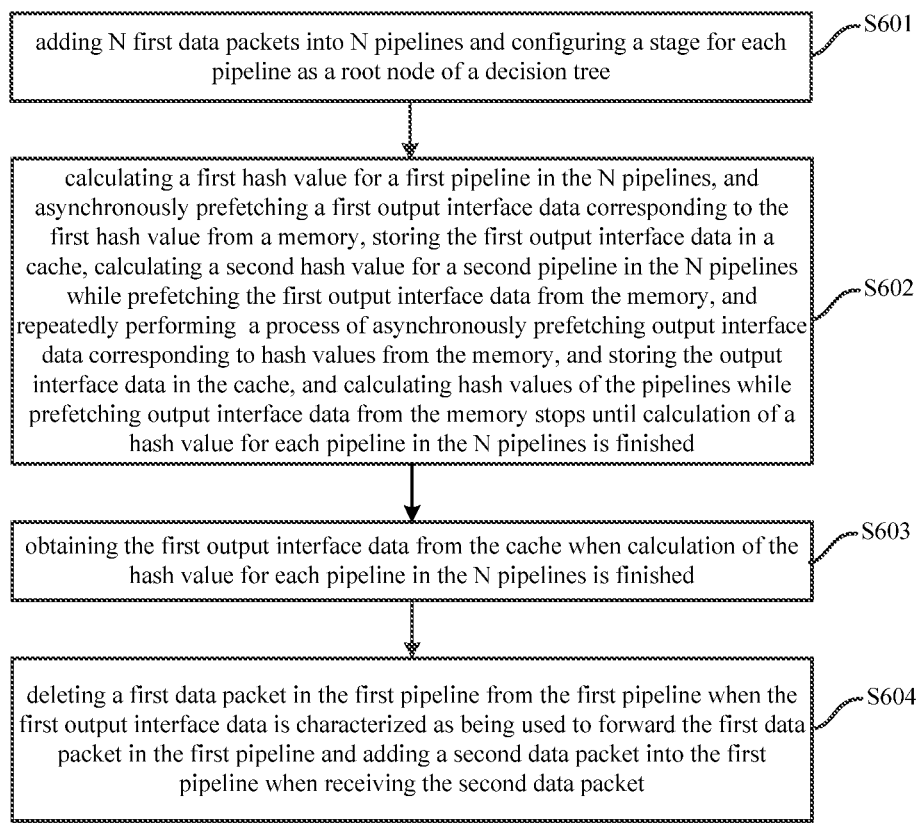
FIG. 6 is a flowchart of a method for packet matching according to an example of the disclosure.

In order to solve the above problem, an example of the disclosure provides a method for packet matching, as shown in FIG. 6, comprising:

S601, adding N first data packets into N pipelines and configuring a stage for each pipeline as a root node of a decision tree.

The decision trees described below are all optimal decision trees. Each of nodes of the decision tree represents a prefix length. N may be preset based on the processing capability of the CPU, e.g., N may be 2.

It is assumed that the current network device receives two data packets, which are respectively packet 1 and packet 2. Destination addresses for the packet 1 and the packet 2 are respectively IPv6Addr1 and IPv6Addr2. The packet 1 may be added into pipeline 1, the packet 2 is added into pipeline 2, and both of the stages for the pipeline 1 and the pipeline 2 are the root node of the decision tree. As the root node of the decision tree is a prefix with the largest probability that is matched, in the example of the present disclosure, each packet to be forwarded is matched starting from the root node of the decision tree, which accelerates the packet matching speed.

S602, calculating a first hash value for a first pipeline in the N pipelines, and asynchronously prefetching a first output interface data corresponding to the first hash value from a memory, storing the first output interface data in a cache, calculating a second hash value for a second pipeline in the N pipelines while prefetching the first output interface data from the memory, and repeatedly performing a process of asynchronously prefetching output interface data corresponding to hash values from the memory, and storing the output interface data in the cache, and calculating hash values of the pipelines while prefetching output interface data from the memory stops until calculation of a hash value for each pipeline in the N pipelines is finished.

The hash value for each pipeline is a hash value of a destination address for the data packet comprised in the pipeline and a prefix length represented by the stage.

The process of prefetching the first output interface data from the memory is an asynchronous operation, calculating the second hash value for the second pipeline in the N pipelines while prefetching the first output interface data from the memory means that after the first hash value for the first pipeline is calculated, CPU thread continues to calculate the hash value for the second pipeline, at the same time, the memory management module in the CPU begins to prefetch the first output interface data from the memory asynchronously.

In the same way, after the CPU tread calculated the second hash value for the second pipeline, no matter whether the memory management module in the CPU has prefetched the first output interface data, the CPU tread continues to calculate a hash value for a third pipeline.

Continues with the example in the above block, it is assumed that the prefix length for the root node is PrefixLen1, and then the network device may calculate a hash value of IPv6Addr1 and PrefixLen1 to obtain HashValue1. The prefetch instruction from the CPU of the network device is performed asynchronously to make the memory management module of the CPU asynchronously obtains the output interface data corresponding to HashValue1 from the memory and cache it in the cache of the CPU.

The operation of the prefetch instruction is an asynchronous operation, i.e., after obtaining HashValue1 by calculation, the CPU tread continues to calculate the hash value of IPv6Addr2 and PrefixLen1 to obtain HashValue2, performing the prefetch instruction from the CPU, which will not affect the process that the CPU thread sequentially calculates a hash value for each pipeline in the N pipelines.

At S603, obtaining the first output interface data from the cache when calculation of the hash value for each pipeline in the N pipelines is finished.

As the CPU has obtained the output interface data corresponding to HashValue1 from memory in advance, and stored it in the cache of the CPU, when the network device needs to obtain the output interface data corresponding to HashValue1 after calculation of the hash value for each pipeline in the N pipelines is finished, the output interface data corresponding to HashValue1 has already been cached in the cache of the CPU, and thus, the network device can obtain the output interface data corresponding to HashValue1 from the cache.

In the same way, after obtaining HashValue2 by calculation, the network device also asynchronously prefetch the output interface data corresponding to HashValue2 and cache it in the cache of the CPU. In turn, when the network device needs to obtain the output interface data corresponding to HashValue2, the network device has no need to access the memory, but can directly obtain the output interface data corresponding to HashValue2 from the cache.

Correspondingly, the network device may sequentially obtain output interface data corresponding to the hash value for each pipeline from the cache.

S604, deleting a first data packet in the first pipeline from the first pipeline when the first output interface data is characterized as being used to forward the first data packet in the first pipeline and adding a second data packet into the first pipeline when receiving the second data packet.

For each pipeline, if the output interface data corresponding to the hash value for the pipeline is characterized as being used to forward the data packet in the pipeline, then the data packet in the pipeline is forwarded via the output interface corresponding to the hash value for the pipeline, and the data packet in the pipeline is deleted from the pipeline.

In the example of the disclosure, after the first data packet in the first pipeline is deleted from the first pipeline, the first pipeline becomes idle, and if the network device receives the second data packet or there is a second data packet that does not match any output interface in the network device, then the second data packet is added into the first pipeline and the stage for the first pipeline is configured as the root node of the decision tree.

By employing the example of the present disclosure, N first data packets can be matched through N pipelines, after the N first data packets are added into the N pipelines, a first hash value for the first pipeline in the N pipelines may be calculated, a first output interface data corresponding to the first hash value is prefetched asynchronously from a memory and the first output interface data is stored in a cache, a second hash value for a second pipeline in the N pipelines is calculated while the first output interface data is prefetched from the memory. In such a manner, it is equivalent that each time a hash value for one pipeline in the N pipelines is calculated, then the output interface data corresponding to the hash value is prefetched from the memory asynchronously, as such, when the first output interface data corresponding to the first hash value needs to be obtained, the first output interface data can be directly obtained from the cache without accessing memory, which reduces the time required for packet matching. If the first output interface data is characterized as being used to forward the first data packet in the first pipeline, then the first data packet in the first pipeline is deleted from the first pipeline, so as that the second data packet is added into the first pipeline for processing. Compared with the prior art in which the received second data packets can be processed only after all the first data packets in the N pipelines have been forwarded, in the example of the present disclosure, as long as a data packet is deleted from a pipeline, a second data packet can be added into the pipeline and started processing, which can accelerate the matching and forwarding speed for the received data packets.

The example of the present disclosure does not limit the storage structure for HASH FIB in the memory. By way of example, in an example of the present disclosure, an FIB summary is stored in a hash bucket in a hash table, each bucket is a 64 Bytes storage space that can store 8 FIB summarys, each FIB summary comprises a tag and a data pointer, the tag is a hash value calculated based on IPv6Addr and PrefixLen, the data pointer is used to indicate a real storage place for an FIB entry.

Based on the storage structure described above, taking the current network device receives two first data packets, and the there are two pipelines in the CPU of the network device as an example, it is assumed that packet 1 and packet 2 are received, the destination addresses for the packet 1 and the packet 2 are respectively IPv6Addr1 and IPv6Addr2, the packet 1 is added into pipeline 1 and the packet 2 is added into the pipeline 2. The root node of the decision tree is PrefixLen1. Then the process above is represented as below:

HashValue1=Hash(IPv6Addr1, PrefixLen1);// HashValue1 is obtained by calculating a hash value of IPv6Addr1 and PrefixLen1;

Prefetch(&Bucket[HashValue1]); //Prompt that the CPU is about to access a bucket containing HashValue1, so that the CPU prefetches a FIB summary in Bucket [HashValue1];

HashValue2=Hash(IPv6Addr2, PrefixLen1);)// HashValue2 is obtained by calculating a hash value of IPv6Addr2 and PrefixLen1;

Prefetch(&Bucket[HashValue2])// Prompt that the CPU is about to access a bucket containing HashValue2, so that the CPU prefetches a FIB summary in Bucket [HashValue2];

DataPointer1=Bucket[HashValue1]; // the network device obtains data in Bucket[HashValue1], at this time as the data in Bucket[HashValue1] is already in the cache, there is no need to access the memory, which at this time does not cause the phenomenon that the CPU waits data. After obtaining the FIB summary in Bucket [HashValue1], the network device may determine whether DataPointer1 corresponding to HashValue1 exists in the FIB summary, if it exists, then subsequently obtains an output interface data corresponding to DataPointer1.

Prefetch(DataPointer1); // Prompt that the CPU is about to access DataPointer1, so that the CPU prefetches the output interface data corresponding to DataPointer1 from the memory and caches it.

DataPointer2=Bucket[HashValue2]; //the network device obtains data in Bucket[HashValue2], at this time, as the FIB summary in Bucket[HashValue2] is already stored in the cache, there is no need to access the memory, which at this time doesn't causes the phenomenon that the CPU waits data. After obtaining the FIB summary in Bucket[HashValue2], the network device may determine whether DataPointer2 corresponding to HashValue1 exists in the bucket, if it exists, subsequently obtains an output interface data corresponding to DataPointer2.

Prefetch(DataPointer2); // Prompt that the CPU is about to access DataPointer2, so that the CPU prefetches the output interface data corresponding to DataPointer2 from the memory.

Access DataPointer1; //the output interface data corresponding to DataPointer1 is obtained, as the output interface data corresponding to DataPointer1 is already stored in the cache, there is no need to access the memory, which does not cause the CPU to wait data.

Access DataPointer2; // the output interface data corresponding to DataPointer2 is obtained, as the output interface data corresponding to DataPointer2 is already stored in the cache, at this time, there is no need to access the memory, which does not cause the CPU to wait.

Update IPv6Addr1 Stage & Output Interface; // Update the stage and output interface of the pipeline to which the packet for IPv6Addr1 belongs;

Update IPv6Addr2 Stage & Output Interface II Update the stage and output interface of the pipeline to which the packet for IPv6Addr2 belongs.

It can be seen that each time the network device needs to obtain data in the memory, data needs to be accessed is already obtained and cached in advance, which can save the time consumed by the network device to access the memory when it needs to obtain the data and accelerate the packet matching speed.

In another example of the present disclosure, after obtaining the first output interface data from the cache in S603, the method further comprises:

determining whether the right child-node of the root node in the decision tree is empty; if the right child-node of the root node is empty, then it is determined that the first output interface data is characterized as being used to forward the first data packet in the first pipeline; and if the right child-node of the root node is not empty, then it is determined that the first output data is not characterized as being used to forward the first data packet in the first pipeline.

For each node in the decision tree, all prefix length(s) of left child-node(s) of the node are smaller than the prefix length(s) of the right child-node(s). If the first output interface data has been obtained, and the right child-node of the root node is empty, it indicates that there is no better matching in the decision tree, therefore, it can be determined that the first output interface data is characterized as being used to forward the first data packet in the first pipeline, then the matching for the packet to be forwarded is finished, and the first data packet in the first pipeline is forwarded via the first output interface.

If the right child-node of the root node is empty, it proves that a prefix length longer than the prefix length corresponding to the root node still exists in HASH FIB. Based on the longest match principle, it needs to be further determined whether the first data packet in the first pipeline can hit a longer prefix length, therefore, the first data interface at this time may not be the optimal matching, i.e., the first output interface data cannot be characterized as being used to forward the first data packet in the first pipeline.

In the example of the present disclosure, when the first output interface data is not characterized as being used to forward the first data packet in the first pipeline, the stage for the first pipeline is updated to a right child-node of the root node, and output interface information in the first pipeline is updated as the first output interface data. Thus, in the next round of matching, the first data packet in the first pipeline is matched with a prefix length represented by the updated stage.

In the next round of matching, a hash value of the first data packet in the first pipeline and the prefix represented by the updated stage will be calculated, and the output interface data corresponding to the hash value is asynchronously obtained. If there is no output interface data corresponding to the hash value obtained, it indicates that the first output interface data is characterized as being used to forward the first data packet in the first pipeline; and if the output interface data corresponding to the hash value is obtained, then the output interface information in the first pipeline is updated as the output interface data obtained at this time.

In another example of the present disclosure, if the first output interface data corresponding to the first hash value is not obtained from the cache, then the stage for the first pipeline is updated to a left child-node of the root node.

If the first output interface data corresponding to the first hash value is not obtained from the cache, it indicates that the first output interface data corresponding to the first hash value is not prefetched from the memory, in other words, the first data packet in the first pipeline does not match the prefix length represented by the root node of the decision tree, and should be matched with a shorter prefix length in the next round of matching, therefore, the stage for the first pipeline may be updated to a left child-node of the root node.

It should be understand that in the example of the present disclosure, after the first data packet in each pipeline is matched once, it is necessary to update the stage in the pipeline. Taking the first pipeline as an example, and it may be specifically classified as the following cases.

In a first case, the first output interface data corresponding to the first hash value for the first pipeline is obtained from the cache, and the first output interface data is characterized as being used to forward the first data packet in the first pipeline, then the stage for the first pipeline is update to be finished matching.

In a second case, the first output interface data corresponding to the first hash value for the first pipeline is obtained from the cache, and the first output interface data is not characterized as being used to forward the first data packet in the first pipeline, then the stage for the first pipeline is updated to the right child-node for the current stage.

For example, if the current stage for the first pipeline is the root node, then the stage for the first pipeline is updated to right child-node of the root node.

In a third case, if the first output interface date corresponding to the first hash value for the first pipeline is not obtained from the cache, then the stage for the first pipeline is updated to the left child-node for the current stage.

For example, if the current stage for the first pipeline is the root node, then the stage for the first pipeline is updated to the left child-node of the root node.

In S603, when calculation of the hash value for each pipeline in the N pipelines is finished, the network device may sequentially obtains output interface data corresponding to the hash value for each pipeline from the cache and sequentially updates stage for the pipeline based on the case for obtaining the output interface data corresponding to the hash value for each pipeline.

The method for updating stage for each pipeline is the same with the method for updating the stage for the first pipeline described herein.

When the stage of each pipeline in the N pipelines is updated once, then the first data packet in the pipeline whose stage is the finished matching, is deleted from the pipeline, so that other data packet(s) received by the network device may be added into the pipeline(s), which improves the efficiency of matching and forwarding the received data packets.

It should be noted, in one case, if the stage of each pipeline in the N pipelines is updated once, there is no pipeline whose stage is the finished matching. In order to complete the matching, the first data packet in the N pipelines is matched in the next round. The method for performing the next round of matching is the same as the method in S602-S604.

In another case, if other data packets received by the network device have been added into the pipelines, and there is no an idle pipeline at this time; or there are no other data packets to be forwarded in the network device, then the data packets in the N pipelines shall be matched in the next round.

It can be seen that, in the example of the present disclosure, N data packets can be matched through N pipelines, when the matching for any data packet is finished, then the data packet is deleted from the pipeline, and other data packets to be forwarded are added into the pipeline, which accelerates the match speed for the packets to be forwarded.

The decision tree shown in FIG. 5c is taken as an example for illustrating the process of dealing a pipeline.

Suppose the number of pipelines is 2, that is, the maximum number of packets to be forwarded processed at the same time is 2.

If the current network device has 4 packets to be forwarded that ordered in time sequence from early to late, and they are Packet 1, Packet 2, Packet 3 and Packet 4 respectively. It is assumed that prefix lengths that hit by the packets to be forwarded are respectively as follows:

Packet 1 hits Prefix 5;
Packet 2 hits Prefix 3;
Packet 3 hits Prefix 5; and
Packet 4 hits Prefix 2.

It is further assumed that output interface corresponding to Prefix1 is 1, output interface corresponding to Prefix2 is 2, output interface corresponding to Prefix3 is 3, output interface corresponding to Prefix4 is 4, output interface corresponding to Prefix5 is 5.

First, Packet 1 and Packet 2 are added into the pipeline, at this time the pipeline is shown as Table 6.

TABLE 6

| Pipeline 1 | Packet 1 | Stage = 5 | Output interface = Default |
|---|---|---|---|
| Pipeline 2 | Packet 2 | Stage = 5 | Output interface = Default |

After one process (an advance operation) for the pipelines is performed, the destination address for Packet1 matches Prefix 5, and it can be known from FIG. 5c, the right child-node for Prefix 5 is empty, then the match for Packet 1 is finished, the stage for the pipeline 1 is updated to be finished matching. However, the destination address of Packet2 fails to match Prefix 5, therefore, Packet2 needs to match Prefix 2, the left child-node for Prefix 5 next time, therefore, stage for the pipeline 2 is updated to 2. At this time, pipelines are as shown in Table 7.

TABLE 7

| Pipeline 1 | Packet 1 | Stage = Finished | Output interface = 5 |
|---|---|---|---|
| Pipeline 2 | Packet 2 | Stage = 2 | Output interface = Default |

At this time, the processing of each pipeline has been finished once; it can be detected whether there is a stage for a pipeline is finished matching. According to Table 7, it can be seen that Packet 1 has finished the matching, therefore, Packet 1 can be deleted from pipeline 1, and Packet1 can be forwarded via output interface 5.

After Packet 1 is deleted from pipeline 1, pipeline 1 becomes idle, and then Packet3 may be added into pipeline 1. As Packet2 has not been matched, Packet2 remains in pipeline 2. At this time, each pipeline is shown in Table 8.

TABLE 8

| Pipeline 1 | Packet 3 | Stage = 5 | Output interface = Default |
|---|---|---|---|
| Pipeline 2 | Packet 2 | Stage = 2 | Output interface = Default |

After a process for the pipelines, each pipeline is shown in Table 9.

TABLE 9

| Pipeline 1 | Packet 3 | Stage = Finished | Output interface = 5 |
|---|---|---|---|
| Pipeline 2 | Packet 2 | Stage = 4 | Output interface = 2 |

It can be known from Table 9, the matching for Packet3 is finished, therefore, Packet3 is deleted from pipeline 1, and Packet4 is added into pipeline 1. At this time, each pipeline is shown in Table 10.

TABLE 10

| Pipeline 1 | Packet 4 | Stage = 5 | Output interface = Default |
|---|---|---|---|
| Pipeline 2 | Packet 2 | Stage = 4 | Output interface = 2 |

Again, after a process for the pipelines, each pipeline is shown in Table 11.

TABLE 11

| Pipeline 1 | Packet 4 | Stage = 2 | Output interface = 2 |
|---|---|---|---|
| Pipeline 2 | Packet 2 | Stage = 3 | Output interface = 3 |

Again, after a process for the pipelines, each pipeline is shown in Table 12.

TABLE 12

| Pipeline 1 | Packet 4 | Stage = 4 | Output interface = 2 |
| Pipeline 2 | Packet 2 | Stage = Finished | Output interface = 3 |

At this time, the matching for Packet2 is finished, Packet2 is deleted from pipeline 2, at this time there is no newly received packet to be forwarded in the network device, therefore, pipeline 2 is empty, after another process for pipeline 1, and each pipeline is shown in Table 13.

TABLE 13

| Pipeline 1 | Packet 4 | Stage = 3 | Output interface = 2 |
| Pipeline 2 | Empty | Empty | Empty |

Again, after a process for the pipelines, each pipeline is shown in Table 14.

TABLE 14

| Pipeline 1 | Packet 4 | Stage = Finished | Output interface = 2 |
| Pipeline 2 | Empty | Empty | Empty |

At this time, the processing of Packet1, Packet 2, Packet 3 and Packet 4 is finished.

Figure 7:
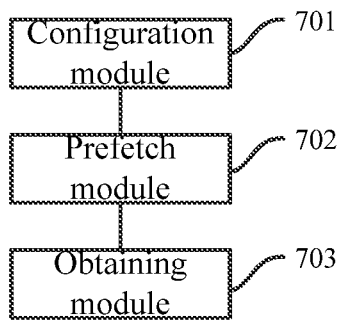
FIG. 7 is a schematic structural diagram of an apparatus for packet matching according to an example of the disclosure.

Corresponding to the method examples above, an example of the present disclosure further provides an apparatus for packet matching, as shown in FIG. 7, the apparatus comprises:
- a configuration module 701 to add N first data packets into N pipelines and configure a stage for each pipeline as a root node of a decision tree, wherein, each of nodes of the decision tree represents a prefix length and prefix lengths for the nodes of the decision tree are different from each other;
- a prefetch module 702 to calculate a first hash value for a first pipeline in the N pipelines, and asynchronously prefetch a first output interface data corresponding to the first hash value from a memory, store the first output interface data in a cache, calculate a second hash value for a second pipeline in the N pipelines while prefetching the first output interface data from the memory, and repeatedly perform a process of asynchronously prefetching output interface data corresponding to hash values from the memory, and storing the output interface data in the cache, and calculating hash values of the pipelines while prefetching output interface data from the memory stops until calculation of a hash value for each pipeline in the N pipelines is finished, wherein, the hash value for each pipeline is a hash value of a destination address for a data packet in the pipeline and a prefix length represented by the stage;
- an obtaining module 703 to obtain the first output interface data from the cache when calculation of the hash value for each pipeline in the N pipelines is finished, wherein
- the configuration module 701 is further to delete a first data packet in the first pipeline from the first pipeline when the first output interface data is characterized as being used to forward the first data packet in the first pipeline and add a second data packet into the first pipeline when receiving the second data packet.

For example, the apparatus further comprises:
- an updating module to update the stage for the first pipeline to a right child-node of the root node when the first output interface data is not characterized as being used to forward the first data packet in the first pipeline, and update output interface information in the first pipeline as the first output interface data.

For example, the apparatus further comprises:
- a determination module to:
  determine whether the right child-node of the root node in the decision tree is empty;
  if the right child-node of the root node is empty, then determine that the first output interface data is characterized as being used to forward the first data packet in the first pipeline; and
  if the right child-node of the root node is not empty, then determine that the first output data is not characterized as being used to forward the first data packet in the first pipeline.

For example, the apparatus further comprises:
- the updating module to update the stage for the first pipeline to a left child-node of the root node if the first output interface data corresponding to the first hash value is not obtained from the cache.

For example, the apparatus further comprises:
- the updating module to update the stage for the first pipeline to be finished matching when the first output interface data is characterized as being used to forward the first data packet in the first pipeline; and
- the configuration module 701 is specifically to delete from the pipelines, a first data packet in a pipeline whose stage is finished matching, after all stages for the N pipelines are updated once.

Figure 8:
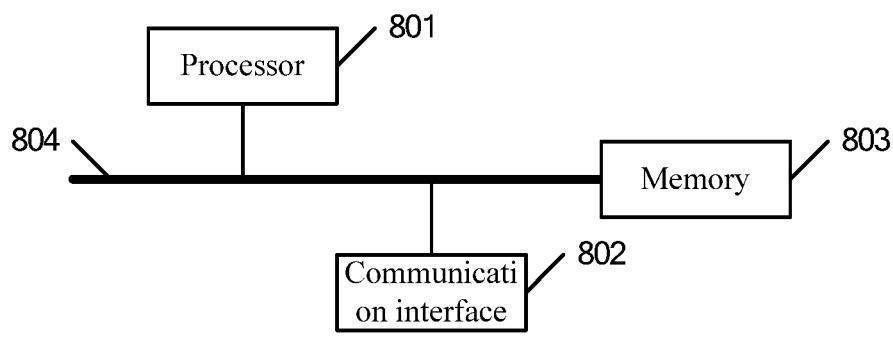
FIG. 8 is a schematic structural diagram of a network device according to an example of the disclosure.

An example of the present disclosure further provides a network device, as shown in FIG. 8, comprising: a processor 801, an communication interface 802, a memory 803 and a communication bus 804, wherein, the processor 801, the communication interface 802, the memory 803 complete intercommunication via the communication bus 804,
- the memory 803 is used to store a computer program;
- the processor 801 is used to implement the blocks in the method examples described above upon execution of the program stored on the memory 803.

The communication bus for the electronic device may be a Peripheral Component Interconnect (PCI) bus or an Extended Industry Standard Architecture (EISA) bus or the like. The communication bus may be divided into address bus, data bus, control bus and the like. For ease of representation, only one thick line is used in the figure, but it does not mean that there is only one bus or one type of bus.

The communication interface is used to communication between the network device and other devices.

The memory may include a Random Access Memory (RAM), or a Non-volatile Memory (NVM), for example, at least one magnetic disk memory. For example, the memory may also be at least one storage device located away from the processor.

The processor may be a general-purpose processor, including a Central Processing Unit (CPU), a Network Processor (NP), etc.; it may also be a Digital Signal Processor (DSP), an Disclosure Specific Integrated Circuit (ASIC), a Field-Programmable Gate Array (FPGA) or other programmable logic devices, discrete gates or transistor logic devices, discrete hardware components.

Another example of the present disclosure further provides a computer-readable storage medium, stored therein a computer program that, upon executed by a processor, implements blocks in any one of methods for packet matching.

Another example of the present disclosure further provides a computer program product containing instructions that, upon executed on a computer, cause the computer to implement any one of methods for packet matching.

The above examples can be all or partly implemented by software, hardware, firmware, or any combination thereof. When implemented by software, it may be all or partly implemented in the form of a computer program product. The computer program product includes one or more computer instructions. When the computer program instructions are loaded and executed on a computer, the procedures or functions described in accordance with the examples of the present disclosure will be realized in whole or in part. The computer may be a general-purpose computer, a special-purpose computer, a computer network, or other programmable device. The computer instructions may be stored in a computer-readable storage medium or transmitted from one computer-readable storage medium to another computer-readable storage medium, for example, the computer instructions may be transmitted from one website, computer, server, or data center to another website, computer, server, or data center via wired (e.g., coaxial cable, fiber optic, Digital Subscriber Line (DSL)) or wireless (e.g., infrared, wireless, microwave, etc.) means. The computer-readable storage medium may be any available medium that can be accessed by the computer, or a data storage device such as a server, a data center, etc. including one or more available media integration. The available media may be a magnetic media (e.g., a floppy Disk, a hard Disk, a magnetic tape), an optical media (e.g., DVD), or a semiconductor media (e.g., a Solid State Disk (SSD)), and the like.

It should be noted that the relationship terms use here, such as "first," "second," and the like are only used to distinguish one entity or operation from another entity or operation, but do not necessarily require or imply that there is actual relationship or order between these entities or operations. Moreover, the terms "include," "comprise," or any variants thereof are intended to cover a non-exclusive inclusion, such that processes, methods, articles, or devices, including a series of elements, include not only those elements that have been listed, but also other elements that have not specifically been listed or the elements intrinsic to these processes, methods, articles, or devices. Without further limitations, elements limited by the wording "comprise(s) a/an . . . " and "include(s) a/an . . . " do not exclude additional identical elements in the processes, methods, articles, or devices, including the listed elements.

All of the examples in the description are described in a correlated manner, and identical or similar parts in various examples can refer to one another. In addition, the description for each example focuses on the differences from other examples. In particular, the example of the system is described briefly, since it is substantially similar to the example of the method, and the related contents can refer to the description of the example of the method.

The examples described above are simply preferable examples of the present disclosure, and are not intended to limit the scope of protection of the present disclosure. Any modifications, alternatives, improvements, or the like within the spirit and principle of the present disclosure shall be included within the scope of protection of the present disclosure.

What is claimed is:

1. A method for packet matching, which comprises:
   adding N first data packets into N pipelines and configuring a stage for each pipeline as a root node of a decision tree, wherein, each of nodes of the decision tree represents a prefix length and prefix lengths for the nodes of the decision tree are different from each other;
   calculating a first hash value for a first pipeline in the N pipelines, and asynchronously prefetching a first output interface data corresponding to the first hash value from a memory, storing the first output interface data in a cache, calculating a second hash value for a second pipeline in the N pipelines while prefetching the first output interface data from the memory, and repeatedly performing a process of asynchronously prefetching output interface data corresponding to hash values from the memory, and storing the output interface data in the cache, and calculating hash values of the pipelines while prefetching output interface data from the memory stops until calculation of a hash value for each pipeline in the N pipelines is finished, wherein, the hash value for each pipeline is a hash value of a destination address for a data packet in the pipeline and a prefix length represented by the stage;
   obtaining the first output interface data from the cache when calculation of the hash value for each pipeline in the N pipelines is finished; and
   deleting a first data packet in the first pipeline from the first pipeline when the first output interface data is characterized as being used to forward the first data packet in the first pipeline and adding a second data packet into the first pipeline when receiving the second data packet.

2. The method of claim 1, wherein, after obtaining the first output interface data from the cache, the method further comprises:
   updating the stage for the first pipeline to a right child-node of the root node when the first output interface data is not characterized as being used to forward the first data packet in the first pipeline, and updating output interface information in the first pipeline as the first output interface data.

3. The method of claim 1, wherein, after obtaining the first output interface data from the cache, the method further comprises:
   determining whether the right child-node of the root node in the decision tree is empty;
   if the right child-node of the root node is empty, then determining that the first output interface data is characterized as being used to forward the first data packet in the first pipeline; and
   if the right child-node of the root node is not empty, then determining that the first output data is not characterized as being used to forward the first data packet in the first pipeline.

4. The method of claim 1, wherein, the method further comprises:
   updating the stage for the first pipeline to a left child-node of the root node if the first output interface data corresponding to the first hash value is not obtained from the cache.

5. The method of claim 1, wherein, the method further comprises:
   updating the stage for the first pipeline to be finished matching when the first output interface data is characterized as being used to forward the first data packet in the first pipeline; and
   deleting a first data packet in the first pipeline comprises:
   deleting from the pipelines, a first data packet in a pipeline whose stage is finished matching, after all stages for the N pipelines are updated once.

6. An apparatus for packet matching, which comprises:
   a configuration module to add N first data packets into N pipelines and configure a stage for each pipeline as a root node of a decision tree, wherein, each of nodes of the decision tree represents a prefix length and prefix lengths for the nodes of the decision tree are different from each other;

a prefetch module to calculate a first hash value for a first pipeline in the N pipelines, and asynchronously prefetch a first output interface data corresponding to the first hash value from a memory, store the first output interface data in a cache, calculate a second hash value for a second pipeline in the N pipelines while prefetching the first output interface data from the memory, and repeatedly perform a process of asynchronously prefetching output interface data corresponding to hash values from the memory, and storing the output interface data in the cache, and calculating hash values of the pipelines while prefetching output interface data from the memory stops until calculation of a hash value for each pipeline in the N pipelines is finished, wherein, the hash value for each pipeline is a hash value of a destination address for a data packet in the pipeline and a prefix length represented by the stage;

an obtaining module to obtain the first output interface data from the cache when calculation of the hash value for each pipeline in the N pipelines is finished, and the configuration module is further to delete a first data packet in the first pipeline from the first pipeline when the first output interface data is characterized as being used to forward the first data packet in the first pipeline and add a second data packet into the first pipeline when receiving the second data packet.

7. The apparatus of claim 6, wherein, the apparatus further comprises:

an updating module to update the stage for the first pipeline to a right child-node of the root node when the first output interface data is not characterized as being used to forward the first data packet in the first pipeline, and update output interface information in the first pipeline as the first output interface data.

8. The apparatus of claim 6, wherein, the apparatus further comprises:

a determination module to:
determine whether the right child-node of the root node in the decision tree is empty;
if the right child-node of the root node is empty, then determine that the first output interface data is characterized as being used to forward the first data packet in the first pipeline; and
if the right child-node of the root node is not empty, then determine that the first output data is not characterized as being used to forward the first data packet in the first pipeline.

9. The apparatus of claim 6, wherein, the apparatus further comprises:

an updating module to update the stage for the first pipeline to a left child-node of the root node if the first output interface data corresponding to the first hash value is not obtained from the cache.

10. The apparatus of claim 6, wherein, the apparatus further comprises:

an updating module to update the stage for the first pipeline to be finished matching when the first output interface data is characterized as being used to forward the first data packet in the first pipeline; and
the configuration module is specifically to delete from the pipelines, a first data packet in a pipeline whose stage is finished matching, after all stages for the N pipelines are updated once.

11. A network device, which comprises: a processor, a communication interface, a memory and a communication bus, wherein, the processor, the communication interface, the memory complete intercommunication via the communication bus, the memory is to store a computer program;
the processor is to implement the blocks in the method of claim 1 upon execution of the program stored on the memory.

12. A non-temporary computer-readable storage medium, stored therein a computer program that, upon executed by a processor, implements blocks in the method of claim 1.

* * * * *

UNITED STATES PATENT AND TRADEMARK OFFICE
CERTIFICATE OF CORRECTION

| | |
|---|---|
| PATENT NO. | : 12,003,418 B2 |
| APPLICATION NO. | : 18/001518 |
| DATED | : June 4, 2024 |
| INVENTOR(S) | : Yang Wang |

It is certified that error appears in the above-identified patent and that said Letters Patent is hereby corrected as shown below:

In the Specification

In Column 11, Line 13-14, please delete "if 2 is selected as the Split, then Cost(2,3)=1+(5%+10%)/(20%+5%+10%)*Cost(3,3)=" and replace with --if 2 is selected as the Split, then Cost(2,3)=1+(5%+10%)/(20%+5%+10%)*Cost(3,3) = 1.42;--.

Signed and Sealed this
Twentieth Day of August, 2024

Katherine Kelly Vidal
*Director of the United States Patent and Trademark Office*